(12) United States Patent
Peng (10) Patent No.: US 10,997,384 B2
(45) Date of Patent: May 4, 2021

(54) SERVICE PROCESS STARTING METHOD AND APPARATUS

(71) Applicant: ADVANCED NEW TECHNOLOGIES CO., LTD., Grand Cayman (KY)

(72) Inventor: Yujun Peng, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 17/111,630

(22) Filed: Dec. 4, 2020

(65) Prior Publication Data

US 2021/0089737 A1    Mar. 25, 2021

Related U.S. Application Data

(63) Continuation of application No. 16/797,882, filed on Feb. 21, 2020, now Pat. No. 10,902,232, which is a (Continued)

(30) Foreign Application Priority Data

Nov. 1, 2017 (CN) .......................... 201711055749.6

(51) Int. Cl.
*G06K 7/14* (2006.01)
*H04L 29/12* (2006.01)
*G06Q 30/02* (2012.01)

(52) U.S. Cl.
CPC ......... *G06K 7/1413* (2013.01); *G06K 7/1417* (2013.01); *G06Q 30/0207* (2013.01); *H04L 61/20* (2013.01)

(58) Field of Classification Search
CPC .... G06K 7/1413; G06K 7/1417; H04L 61/20; G06Q 30/0207
See application file for complete search history.

(56) References Cited

U.S. PATENT DOCUMENTS 7,672,543 B2    3/2010    Hull et al.
7,702,624 B2    4/2010    King et al.
(Continued)

FOREIGN PATENT DOCUMENTS

CN    102110088 A    6/2011
CN    103595960 A    2/2014
(Continued)

OTHER PUBLICATIONS

First Search for Taiwan Application No. 10713081, dated Sep. 6, 2019, 1 page.
(Continued)

*Primary Examiner* — Seung H Lee (57) ABSTRACT

A method for starting an operation process comprises: receiving an operation request message from a terminal device in response to the terminal device scanning a barcode to obtain barcode information and determining an address of the server based on the barcode information, the operation request comprising an image of text associated with the barcode scanned by the terminal device, and the image of text specifying an operation function; determining text content based on the image of text; searching a correspondence relationship between different text content and respective operation access information to obtain operation access information corresponding to the determined text content; and returning the operation access information to the terminal device, for the terminal device to start an operation process by using the operation access information, the operation process having the operation function specified by the received image of text.

20 Claims, 4 Drawing Sheets

Related U.S. Application Data continuation of application No. PCT/CN2018/105728, filed on Sep. 14, 2018.

(56) References Cited

U.S. PATENT DOCUMENTS

| | | | |
|---|---|---|---|
| 7,761,326 | B2 | 7/2010 | Miyaoku et al. |
| 8,488,916 | B2 | 7/2013 | Terman |
| 8,600,989 | B2 | 12/2013 | Hull et al. |
| 8,619,287 | B2 | 12/2013 | King et al. |
| 8,874,504 | B2 | 10/2014 | King et al. |
| 8,905,298 | B2 | 12/2014 | Paintin |
| 9,002,727 | B2 * | 4/2015 | Horowitz ............ G06Q 30/0207 705/14.19 |
| 9,202,254 | B2 | 12/2015 | Rodriquez et al. |
| 9,204,038 | B2 | 12/2015 | Lord et al. |
| 9,256,806 | B2 | 2/2016 | Aller et al. |
| 9,275,051 | B2 | 3/2016 | King et al. |
| 9,323,784 | B2 | 4/2016 | King et al. |
| 9,349,133 | B2 * | 5/2016 | Park ..................... G06Q 30/02 |
| 9,405,751 | B2 | 8/2016 | Hull et al. |
| 2003/0022678 | A1 | 1/2003 | Kang |
| 2011/0098029 | A1 | 4/2011 | Rhoads et al. |
| 2012/0134548 | A1 | 5/2012 | Rhoads et al. |
| 2012/0325902 | A1 * | 12/2012 | Goyal ..................... G06F 19/00 235/375 |
| 2014/0006594 | A1 | 3/2014 | Huang |
| 2014/0298293 | A1 | 10/2014 | Nishio et al. |
| 2017/0078145 | A1 * | 3/2017 | Tesavis ............... H04L 41/0889 |
| 2017/0109349 | A1 | 4/2017 | Rosen et al. |
| 2018/0315107 | A1 | 11/2018 | Connolly et al. |
| 2019/0138877 | A1 | 5/2019 | Li et al. |

FOREIGN PATENT DOCUMENTS

| | | |
|---|---|---|
| CN | 106325939 A | 1/2017 |
| CN | 106897341 A | 6/2017 |
| CN | 107092634 A | 8/2017 |
| CN | 108021954 A | 5/2018 |
| CN | 105224075 B | 6/2019 |
| EP | 2559030 B1 | 6/2017 |
| KR | 100980748 B1 | 9/2010 |
| TW | 201508533 A | 3/2015 |
| TW | 201427173 A | 7/2017 |
| WO | 2015027849 A1 | 3/2015 |

OTHER PUBLICATIONS

Search Report for European Application No. 18872340.7, dated Oct. 13, 2020.
First Search Report for Chinese Application No. 201711055749.6, dated Mar. 5, 2019, 1 page.
Supplementary Search for Chinese Application No. 201711055749.6, dated Apr. 8, 2020.
First Office Action for Chinese Application No. 201711055749.6, dated Mar. 19, 2019, 10 pages.
Second Office Action for Chinese Application No. 201711055749.6, dated Dec. 19, 2019, 12 pages.
International Search Report and Written Opinion for Application No. PCT/CN2018/105728, dated Dec. 19, 2018, 9 pages.
International Preliminary Report on Patentability for Application No. PCT/CN2018/105728, dated May 14, 2020.

* cited by examiner

Become a member

FIG. 3

Receive a coupon

SERVICE PROCESS STARTING METHOD AND APPARATUS

CROSS-REFERENCE TO RELATED APPLICATIONS

The present application is a continuation application of U.S. patent application Ser. No. 16/797,882, filed on Feb. 21, 2020, which is a continuation application of International Patent Application No. PCT/CN2018/105728, filed on Sep. 14, 2018, which is based on and claims priority to the Chinese Patent Application No. 201711055749.6, filed on Nov. 1, 2017 and entitled "SERVICE PROCESS STARTING METHOD AND APPARATUS." The above-referenced applications are incorporated herein by reference in their entirety.

TECHNICAL FIELD

The application relates to the field of network communication technologies, and in particular, to a method and apparatus for starting an operation process.

BACKGROUND

A barcode is a group of bars and spaces arranged according to some coding rules and is used for representing some information formed by characters, numbers and symbols. Barcodes comprise one-dimensional barcodes and two-dimensional barcodes, where a one-dimensional barcode represents information by multiple black bars and spaces arranged according to a rule, and a two-dimensional barcode (also referred to as a Quick Response (QR) code) records information by a pattern in black and white with a particular geometric shape distributed on a plane (in two-dimensional directions) according to a rule.

With the development of mobile Internet technologies and smart terminal devices, people become increasingly used to complete various tasks in work and life by using networks. These tasks may be regarded as operation performed based on networks. In the operation performed in combination with an offline scenario, the approach through scanning a barcode has been extensively used to start an operation process. However, to deploy barcodes in an offline scenario, the barcodes need to be generated, and barcode materials need to be printed and placed. How to reduce material and labor costs required by starting an operation process via the way of scanning barcodes is an issue to be considered in implementing the operation process.

SUMMARY

In view of the above, embodiments of the specification provides a computer-implemented method for starting an operation process. The method comprises: receiving an operation request message from a terminal device in response to the terminal device scanning a barcode to obtain barcode information and determining an address of the server based on the barcode information, the operation request comprising an image of text associated with the barcode scanned by the terminal device, and the image of text specifying an operation function; determining text content based on the image of text; searching a correspondence relationship between different text content and respective operation access information to obtain operation access information corresponding to the determined text content; and returning the operation access information to the terminal device, for the terminal device to start an operation process by using the operation access information, the operation process having the operation function specified by the received image of text.

In some embodiments, the operation request message further comprises: an identifier of a barcode provider of the barcode.

In some embodiments, the correspondence relationship between different text content and respective operation access information comprises: correspondence relationship among a plurality of identifiers of barcode providers, the different text content and respective operation access information.

In some embodiments, searching a correspondence relationship between different text content and respective operation access information to obtain operation access information corresponding to the determined text content comprises: searching the correspondence relationship to obtain operation access information corresponding to the identifier of the barcode provider of the barcode and the determined text content.

In some embodiments, the method further comprises: returning default operation access information to the terminal device in response to determining that the correspondence relationship does not comprise the determined text content.

In some embodiments, the operation access information comprises: an address of an operation process start page or invocation information of an operation access program.

In some embodiments, the operation process comprises: user registration or receiving a coupon.

Embodiments of the specification further provides another computer-implemented method for starting an operation process. The method comprises: scanning a barcode to obtain barcode information and obtain an image of text associated with the barcode, the image of text specifying an operation function; determining an address of a server based on the barcode information; recognizing the image of text to determine text content; sending to the server according to the address of the server an operation request message comprising the text content, for the server to determine operation access information according to a correspondence relationship between the text content and the operation access information; receiving the operation access information from the server; and starting an operation process by using the operation access information, the operation process having the operation function specified by the image of text.

In some embodiments, scanning a barcode to obtain barcode information and obtain an image of text associated with the barcode comprises: scanning the barcode and the image of text associated with the barcode to obtain the barcode information and to obtain the image of text.

In some embodiments, the method further comprises: extracting an identifier of a barcode provider of the barcode from the barcode information; and wherein the operation request message further comprises: the identifier of the barcode provider of the barcode.

In some embodiments, the correspondence relationship between the text content and the operation access information comprises: correspondence relationship among a plurality of identifiers of barcode providers, different text content and respective operation access information.

In some embodiments, the operation process comprises: user registration or receiving a coupon.

In some embodiments, the operation access information comprises: an address of an operation process start page or invocation information of an operation access program.

In some embodiments, the operation access information is default operation access information; and starting an operation process by using the operation access information comprises: starting a default operation process by using the default operation access information.

Embodiments of the specification further provides an apparatus for starting an operation process. The apparatus comprises: one or more processors and one or more non-transitory computer-readable memories coupled to the one or more processors and configured with instructions executable by the one or more processors to cause the apparatus to perform operations comprising: receiving an operation request message from a terminal device in response to the terminal device scanning a barcode to obtain barcode information and determining an address of the server based on the barcode information, the operation request comprising an image of text associated with the barcode scanned by the terminal device, and the image of text specifying an operation function; determining text content based on the image of text; searching a correspondence relationship between different text content and respective operation access information to obtain operation access information corresponding to the determined text content; and returning the operation access information to the terminal device, for the terminal device to start an operation process by using the operation access information, the operation process having the operation function specified by the received image of text.

Embodiments of the specification further provides a computer readable storage medium, wherein the computer readable storage medium stores a computer program, and the computer program, when executed by a processor, implements any one of the above-described methods for starting an operation process.

From the above-described embodiments of the specification, the correspondence relationship between second function information and operation access information is maintained at a server; a terminal device scans a barcode to obtain first function information of the barcode and then uploads the first function information to the server; the server determines second function information according to the first function information and returns operation access information corresponding to the second function information to the terminal device; the terminal device starts an operation process by using the operation access information, the operation process having a specified operation function. As a result, the same barcode can be used to start two or more operation processes, thereby reducing the material and labor costs required by barcode deployment; and a new operation process can be started by introducing first function information and a correspondence relationship between second function information and operation access information, without the need of deploying a new barcode for the new operation process, accelerating the launch of the new operation.

DETAILED DESCRIPTION OF THE INVENTION

The embodiments of the specification provide a method for starting an operation process, by which a terminal device scans a barcode to obtain first function information of the barcode, a server receives the first function information uploaded by the terminal device, determines second function information according to the first function information and then returns operation access information corresponding to the second function information to the terminal device, and the terminal device starts an operation process according to the received operation access information, the operation process having an operation function specified by the first function information, thereby using the barcode repeatedly for multiple operation processes through the first function information without the need to deploy a respective barcode for each operation process, reducing labor and material costs of applying barcodes in offline scenarios; in addition, a new operation process for implementing a new operation function can be rapidly started by adding first function information, second function information and corresponding operation access information for the new operation function without the need to deploy a new barcode.

In the embodiments of the specification, a terminal device and a server of a sender and a terminal device and a server of a receiver of an instant message may access each other via a network, where the terminal device (e.g., the terminal device of the sender and/or the receiver) may be a cell phone, a tablet computer, a Personal Computer (PC), a laptop computer, or other devices; the server may be a physical or logical server, or may include two or more physical or logical servers having different responsibilities of achieving various functions of the server in the embodiments of the specification through collaboration. The types of the terminal device and the server, the types and protocols of a communication network between a terminal device and a server of the sender and between a terminal device and a server of the receiver, and the like are not limited by the embodiments of the specification.

The embodiments of the specification may be implemented on any device having computing and storage capabilities, such as a cell phone, a tablet computer, a PC, a laptop computer, a server and the like; moreover, various functions of the embodiments of the specification may be achieved by logic nodes operating on two or more devices.

In the embodiments of the specification, the terminal device and the server may access each other via a network, where the terminal device may be a cell phone, a tablet computer, a PC, a laptop computer, or other devices; the server may operate on one or more devices, such as PCs, and laptop computers, or, may include two or more logical servers operating separately and collaborating to achieve various functions of the server in the embodiments of the specification. The types of the terminal devices and the devices where the server is located, the types and protocols of a communication network between terminal devices and servers, and the like are not limited by the embodiments of the specification.

Figure 1:
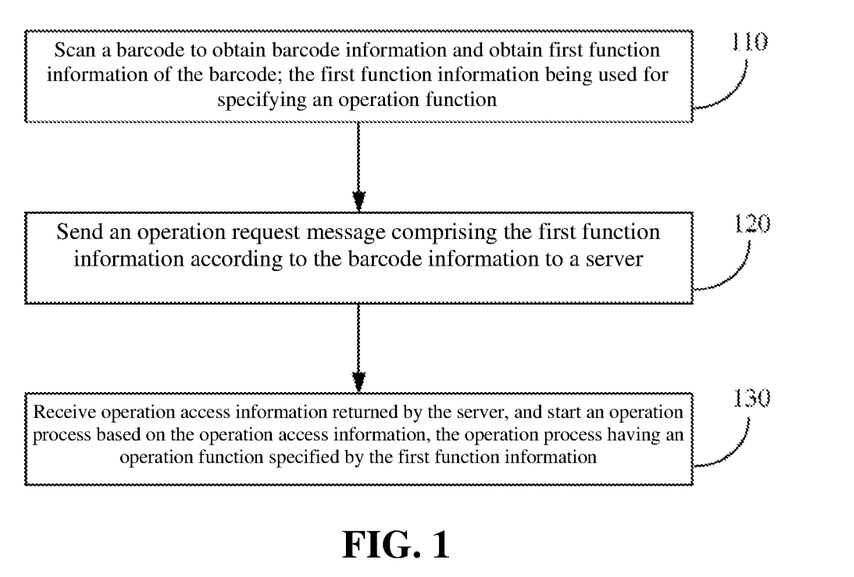
FIG. 1 is a flow chart of a method for starting an operation process, applied to a terminal device, according to some embodiments of the specification.
Figure 2:
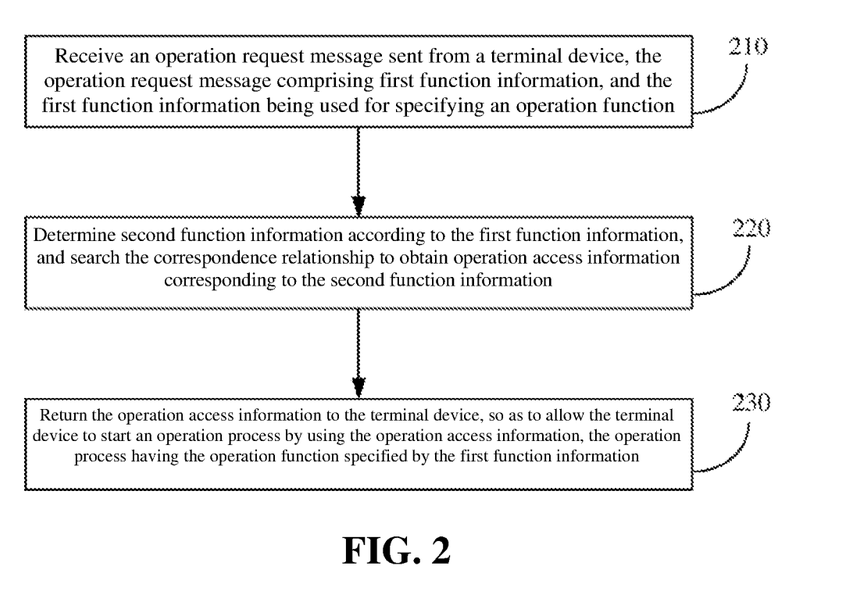
FIG. 2 is a flow chart of a method for starting an operation process, applied to a server, according to some embodiments of the specification.

In the embodiments of the specification, the flow of a method for starting an operation process, applied to a terminal device, is as shown in FIG. 1, and the flow of a method for starting an operation process, applied to a server, is as shown in FIG. 2.

At step 110, in the terminal device, the method may include scanning a barcode to obtain barcode information and obtain first function information of the barcode.

At step 120, in the terminal device, the method may include sending an operation request message comprising the first function information to a server according to the barcode information.

At step 210, in the server, the method may include receiving the operation request message sent from the terminal device.

At step 220, in the server, the method may include determining second function information according to the first function information, and searching a correspondence relationship between second function information and operation access information to obtain operation access information corresponding to the second function information.

In the embodiments of the specification, the first function information and the second function information are used for specifying operation functions. The first function information is associated with a barcode. For example, any information containing changeable content obtained by a terminal device when (e.g., including at the same time as, before, and after) the terminal device scans a barcode may be used to generate first function information associated with the barcode. An operation function to be implemented by an operation process to be started may be specified through different contents of the first function information associated with the barcode. For example, the first function information may be an image of text (or the text content in the image), terminal device attitude (while the terminal device is scanning a barcode), fingerprint or voice input (e.g., obtained after a terminal device scans a barcode) used to specify an operation function. Different operation functions may be specified through different text contents in the images of text, different attitudes, different fingerprints or different voice contents. The terminal device attitude may be the terminal device's orientation in a three-dimensional space relative to a reference frame. For example, the terminal device attitude may be represented by values of roll, pitch, and yaw. The second function information may be determined by the server according to the first function information. The second function information may be the first function information per se or may be data obtained by processing the first function information. The server maintains a correspondence relationship between the second function information and operation access information.

According to a user's operation, the terminal device may scan a barcode presented by a barcode provider and extract barcode information from image data of the barcode. The terminal device may use the barcode information to initiate a connection to the server and send an operation request message to the server. The operation request message comprises the first function information and may further comprise other information carried by the terminal device when initiating an access to the server after scanning the barcode. The server may receive the operation request message from the terminal device, determine second function information according to the first function information extracted from the operation request message, and search the maintained correspondence relationship to obtain operation access information corresponding to the second function information.

An implementation manner in which the terminal device scans a barcode, extracts barcode information from image data of the barcode, and initiates an access to the server according to the barcode information may be achieved with reference to the various technologies, which will not be elaborated. In the embodiments of the specification, the barcode may be either a one-dimensional barcode or a two-dimensional barcode.

In some embodiments, if a user makes incorrect operations on the terminal device or something goes wrong when a server processes the first function information uploaded by a terminal device to obtain second function information, it is possible that the server is unable to find the second function information in the maintained correspondence relationship. Default operation access information may be set for this type of situations. When the correspondence relationship does not comprise second function information determined according to the first function information, the server may return the default operation access information to the terminal device. Upon receiving the default operation access information, the terminal device may use the default operation access information to start a default operation process. The default operation process may or may not be an operation process having the operation function specified by the first function information.

With regard to some operation performed between barcode providers and users using terminal devices, for the same first function information, different barcode providers may start different operation processes to achieve different functions, thereby achieving personalized operation with respect to the barcode providers. In these circumstances, a correspondence relationship among identifiers of different barcode providers (also referred to as barcode provider identifiers), different second function information and operation access information may be maintained at a server; a terminal device may extract a barcode provider identifier from the barcode information, package the first function information and the barcode provider identifier in an operation request message, and send the operation request message to the server; after determining second function information according to the first function information, the server may search the maintained correspondence relationship to obtain operation access information corresponding to the barcode provider identifier and the second function information. In some embodiments, a barcode provider may set its own correspondence relationship among the barcode provider identifier, second function information and operation access information at a server, so as to independently determine and manage its own operation process.

Formats of the first function information and the second function information and manners in which the terminal device obtains the first function information may be determined according to factors such as requirements of embodiments, features of the operation, and the like, which are not limited by the embodiments of the specification. Embodiments and examples will be provided below for illustration.

In some embodiments, a barcode provider displays a barcode having an image of text, a terminal device scans the image of text as well as the barcode. For example, the image of text surrounds the barcode or is embedded in the barcode.

Different text content may correspond to different operation functions. A correspondence relationship between text content and operation access information is maintained at a server.

For example, the terminal device scans the barcode to obtain barcode information and an image of text of the barcode, uses the image of text as the first function information, and uploads the first function information to the server in an operation request message. The server recognizes the image of text uploaded by the terminal device to obtain the text content (e.g., the second function information), and further searches the correspondence relationship to obtain operation access information corresponding to the text content.

In another example, the terminal device scans the barcode to obtain barcode information and an image of text of the barcode, uses the text content obtained by recognizing the image of text as the first function information, and uploads the first function information to the server in an operation request message. The server uses the text content received from the terminal device as the second function information, and searches the correspondence relationship to obtain operation access information corresponding to the text content.

In some embodiments, different measurements of the attitude of a terminal device when scanning a barcode are used to start different operation processes to achieve different functions. A correspondence relationship between attitude information (e.g., including different attitudes of the terminal device) and operation access information is maintained at a server.

For example, the terminal device scans the barcode to obtain barcode information, collects output data from a gyroscope of the terminal device when scanning the barcode, uses the gyroscope's output data to determine attitude information (e.g., attitude measurements) of the terminal device when scanning the barcode, uses the attitude information as the first function information, and uploads the first function information to the server in an operation request message. The server uses the attitude information received from the terminal device as the second function information, and searches the correspondence relationship to obtain operation access information corresponding to the attitude information.

In some embodiments, a terminal device prompts a user (e.g., a user operating on the terminal device) to input a fingerprint when scanning a barcode or prompts the user to input a fingerprint after scanning the barcode, and fingerprints of different fingers may correspond to different operation functions. A correspondence relationship between fingerprint identifiers and operation access information is maintained at a server. An identifier of a fingerprint (also referred to as a fingerprint identifier) may be associated with or correspond to a fingerprint of a respective finger.

For example, the terminal device scans the barcode to obtain barcode information, receives a fingerprint input by the user and generates fingerprint data, uses the fingerprint data as the first function information, and uploads the first function information to the server. The server recognizes the fingerprint data uploaded by the terminal device to obtain a fingerprint identifier (the second function information) corresponding to the fingerprint data, and searches the correspondence relationship to obtain operation access information corresponding to the fingerprint identifier.

In another example, the terminal device scans the barcode to obtain barcode information and receives a fingerprint input by the user. The terminal device recognizes the input fingerprint to obtain a fingerprint identifier of the input fingerprint, uses the fingerprint identifier as the first function information, and uploads the first function information to the server in an operation request message. The server uses the fingerprint identifier received from the terminal device as the second function information, and searches the correspondence relationship to obtain operation access information corresponding to the fingerprint identifier.

In some embodiments, a terminal device prompts a user to use voice to speak out an operation function to be used while or before scanning a barcode. The user may start, using the speech, an operation process that achieves the function. The speech may contain one or more function keywords, as well as other words which may indicate a context. A correspondence relationship between function keywords and operation access information is maintained at a server.

For example, the terminal device scans the barcode to obtain barcode information, receives a speech input by the user and generates audio data, uses the audio data as the first function information, and uploads the first function information to the server. The server recognizes the audio data uploaded by the terminal device to obtain text, determines a function keyword (the second function information) expressed by the audio data according to a recognition result (e.g., the obtained text, etc.), and searches the correspondence relationship to obtain operation access information corresponding to the function keyword.

In another example, the terminal device scans the barcode to obtain barcode information, receives a speech input by the user, recognizes the input speech of the user to obtain text, uses the text as the first function information, and uploads the first function information to the server. The server determines a function keyword (the second function information) expressed by the text uploaded by the terminal device, and searches the correspondence relationship to obtain operation access information corresponding to the function keyword.

In the above-described examples, the server may use various semantic analysis technologies or other related technologies to analyze the text to obtain a function keyword, which is not limited by the specification.

At step 230, in the server, the method may include returning the operation access information to the terminal device.

At step 130, in the terminal device, the method may include receiving the operation access information returned by the server, and starting an operation process based on the operation access information, where the operation process has an operation function specified by the first function information.

The server returns the operation access information corresponding to the second function information to the terminal device, and the terminal device starts the operation process for achieving the operation function specified by the first function information by using the returned operation access information.

In the embodiments of the specification, the operation access information may be various information required by the terminal device when starting an operation process, and may be determined according to factors such as working modes between a terminal device and a server, operating manners of the operation, and the like, in practical embodiments, for which no limitation is placed by the specification.

For example, the operation access information may be a page address of an operation process start page accessible through a network, and the terminal device starts a particular operation process when accessing this start page; and different pages may be accessed when different operation processes are to be started. In another example, the operation access information may also be invocation information of an operation access program, and the terminal device starts a particular operation process when using the invocation information to start the execution of the operation access program; and different operation access programs (e.g., different Apps installed on the terminal device) may be executed by different operation processes, or different invocation information may be used to execute the same operation access program.

Therefore, in the embodiments of the specification, after scanning the barcode and obtaining the first function information of the barcode, the terminal device uploads the first function information to the server, the server determines second function information according to the first function information and returns operation access information corresponding to the second function information to the terminal device; the terminal device starts an operation process by using the operation access information, where the operation process has a specified operation function. According to the embodiments of the specification, the same barcode can be used to start two or more operation processes, and there is no need to deploy a respective barcode for each operation process, thereby reducing material and labor costs required by barcode deployment.

Some embodiments of the specification are described above, and other embodiments fall within the scope of the appended claims. In some situations, actions or steps set forth in the claims may be executed in an order different from those in the embodiments and can still achieve desired results. In addition, processes depicted in the accompanying drawings may not necessarily require the illustrated order or a continuous order to achieve desired results. In some implementation manners, multi-task processing and parallel processing are also feasible or may be beneficial.

In an application example of the specification, in the correspondence relationship between second function information and operation access information maintained at the server, a merchant configures "Become a member" to correspond to a program access address for downloading and installing an application (App) of the merchant and performing user registration, and configures the operation access information to be default operation access information. The merchant provides the QR code and an image having text of "Become a member" as shown in FIG. 3 for users' terminal devices to scan.

Figure 3:
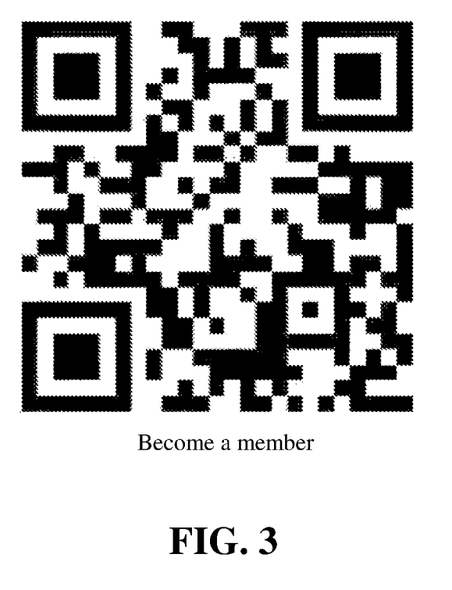
FIG. 3 is a schematic diagram of a QR code having an image of text in an application example of the specification.
Figure 4:
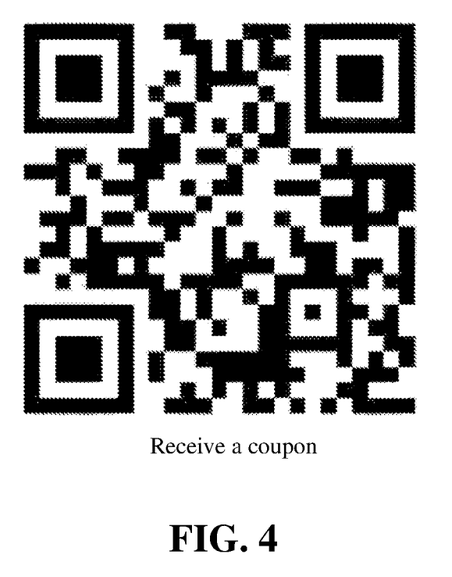
FIG. 4 is a schematic diagram of another QR code having an image of text in an application example of the specification.

When the merchant holds a temporary promotion event, in the correspondence relationship between second function information and operation access information maintained at the server, the merchant configures "Receive a coupon" to correspond to a program access address for receiving this merchant's coupon in an App of a third-party payment platform, and changes the image of text in the QR code shown in FIG. 3 to have the text of "Receive a coupon." The QR code with the image having the changed text to be presented to users is shown in FIG. 4. After the promotion event ends, the merchant changes the image in the QR code back to that shown in FIG. 3.

While scanning a QR code, a user's terminal device also takes an image of text associated with the QR code. The terminal device obtains a server address and a merchant identifier from the QR code information, and sends an operation request message including the image of text and the merchant identifier to the server. Upon receiving the operation request message, the server recognizes the text content in the image of text and searches the correspondence relationship for operation access information corresponding to the text content. If the operation access information is found, the server returns the corresponding operation access information to the terminal device, and the terminal device starts the running of a corresponding program using the returned operation access information. When the QR code shown in FIG. 3 is scanned, the merchant's App is downloaded and installed, and user registration is performed. When the QR code shown in FIG. 4 is scanned, this merchant's coupon is received in an App of a third-party payment platform on the terminal device. If the server does not find the recognized text content in the correspondence relationship, the server returns the default operation access information to the terminal device, and the terminal device runs the operation process of downloading and installing the App of the merchant and performing user registration.

In this way, the merchant does not need to make and place new QR code materials for a temporary promotion event, and the original QR code can be used to start a new operation process by revising the image of text associated with the QR code.

In another application example of the specification, in an App having instant communication and payment functions, each user has the user's own QR code at a client. In the correspondence relationship between second function information and operation access information, the server of the App configures "vertical" to correspond to an address of an adding contact page of this App and "horizontal" to correspond to a payment page address of this App.

For example, User A of this App displays User A's own QR code on a tablet computer for User B's cell phone to scan. While scanning the QR code, this App's client on User B's cell phone extracts output data of a gyroscope on the cell phone, and determines whether the attitude of the cell phone is horizontal (e.g., whether the cell phone's screen is parallel to the floor) or vertical (e.g., whether the cell phone's screen is perpendicular to the floor) while scanning the QR code. The App client of User B sends the attitude information (e.g., "horizontal" or "vertical") and User A's identifier to the server in an operation request message. The server searches the correspondence relationship for a page address corresponding to the attitude information of User B's cell phone, and returns the corresponding page address and User A's information to User B's client, such that User B's client starts a corresponding operation process.

In this way, the same QR code of User A can be used, through the cell phone's attitude measurements while scanning the QR code, to start different operation processes for achieving different functions without the need to compile codes for generating and presenting a second QR code for a second operation process and to update the client software.

Figure 5:
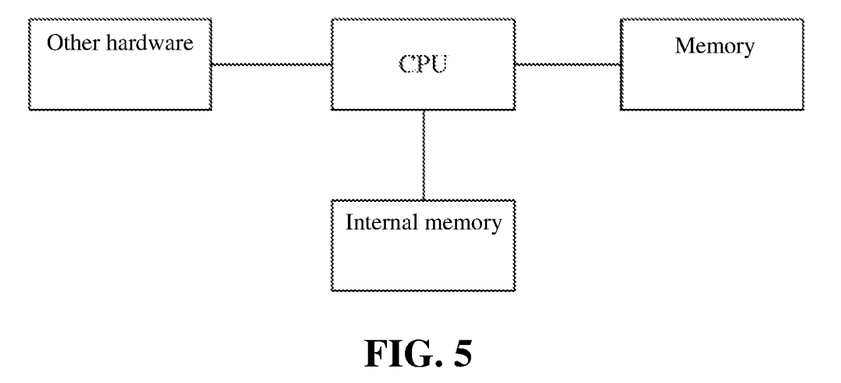
FIG. 5 is a hardware structural diagram of a terminal device or a device where a server is located, according to some embodiments of the specification.

Corresponding to the above-described flows of the methods, the embodiments of the specification further provide an apparatus for starting an operation process, applied to a terminal device, and an apparatus for starting an operation process, applied to a server. These two apparatuses can both be implemented through software, or may also be implemented through hardware or a combination of software and hardware. Taking software implementation as an example, an apparatus in the logical sense is formed by a Central Process Unit (CPU) of a device where the terminal device or server is located reading a corresponding computer program instruction into a memory for running. From a hardware perspective, in addition to the CPU, memory and storage shown in FIG. 5, the terminal device where the apparatus for starting an operation process is located may also comprise other hardware, such as a chip for receiving and transmitting wireless signals, and the device where the apparatus for starting an operation process applied to a server is located may also comprise other hardware, such as a board or card for achieving network communication functions.

Figure 6:
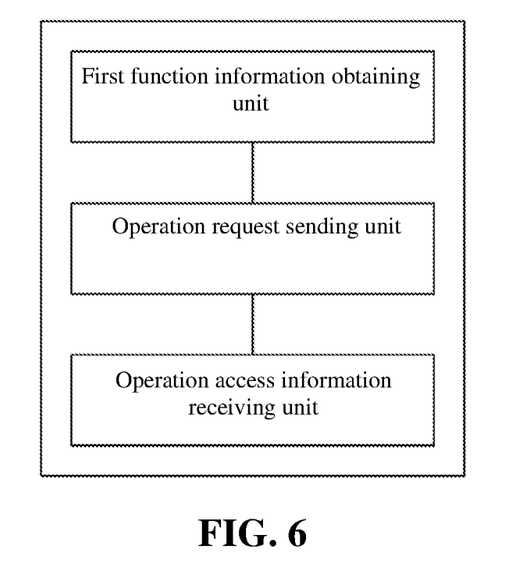
FIG. 6 is a structural diagram of an apparatus for starting an operation process, applied to a terminal device, according to some embodiments of the specification.

FIG. 6 illustrates an apparatus for starting an operation process, applied to a terminal device, according to some embodiments of the specification. The apparatus comprises: a first function information obtaining unit, an operation request sending unit, and an operation access information receiving unit, where the first function information obtaining unit is configured to scan a barcode to obtain barcode information and obtain first function information of the barcode, the first function information being used for specifying an operation function; the operation request sending unit is configured to send, according to the barcode information, an operation request message comprising the first function information to a server, for the server to determine second function information according to the first function information and determine operation access information according to a correspondence relationship between the second function information and the operation access information; and the operation access information receiving unit is configured to receive the operation access information returned by the server, and start an operation process by using the operation access information, the operation process having the operation function specified by the first function information.

In some embodiments, the barcode information comprises: a barcode provider identifier; the operation request message further comprises: a barcode provider identifier; and the server determining operation access information according to a correspondence relationship between the second function information and the operation access information comprises: the server determining operation access information according to a correspondence relationship among the barcode provider identifiers, the second function information and the operation access information.

In some embodiments, the first function information obtaining unit is configured to, for example, scan a barcode to obtain barcode information and an image of text of the barcode and use the image of text as the first function information; alternatively, scan a barcode to obtain barcode information and an image of text of the barcode and use text content obtained by recognizing the image of text as the first function information.

In some embodiments, the first function information comprises: attitude information of the terminal device; the first function information obtaining unit is configured to, for example, scan a barcode to obtain barcode information, and use output data of a gyroscope of the terminal device to determine attitude information of the terminal device when scanning the barcode.

In some embodiments, the first function information obtaining unit is configured to, for example, scan a barcode to obtain barcode information, receive a fingerprint input by a user and generate fingerprint data, and use the fingerprint data as the first function information; alternatively, scan a barcode to obtain barcode information, receive a fingerprint input by a user, recognize the input fingerprint to obtain a corresponding fingerprint identifier, and use the fingerprint identifier as the first function information.

In some embodiments, the first function information obtaining unit is configured to, for example, scan a barcode to obtain barcode information, receive a speech input by a user and generate audio data, and use the audio data as the first function information; alternatively, scan a barcode to obtain barcode information, receive a speech input by a user, recognize the input speech to obtain a text, and use the text as the first function information.

Figure 7:
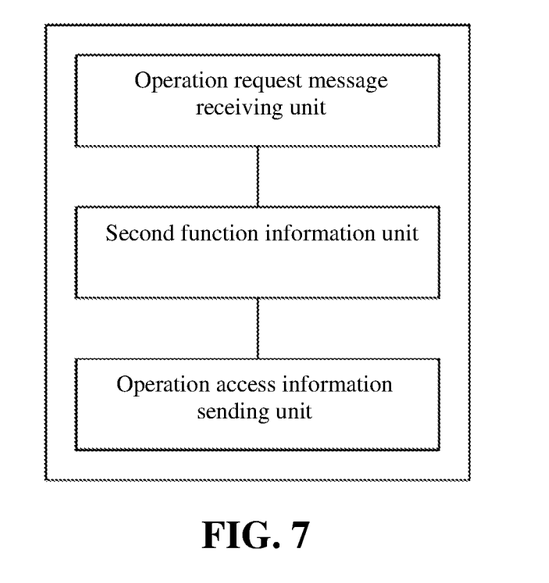
FIG. 7 is a structural diagram of an apparatus for starting an operation process, applied to a server, according to some embodiments of the specification.

FIG. 7 illustrates an apparatus for starting an operation process, applied to a server, according to some embodiments of the specification, where the server maintains a correspondence relationship between second function information and operation access information, and the apparatus comprises an operation request message receiving unit, a second function information unit, and an operation access information sending unit, where the operation request message receiving unit is configured to receive an operation request message comprising first function information sent from a terminal device, the first function information being used for specifying an operation function; the second function information unit is configured to determine second function information according to the first function information, and search the correspondence relationship to obtain operation access information corresponding to the second function information; and the operation access information sending unit is configured to return the operation access information to the terminal device, for the terminal device to start an operation process by using the operation access information, the operation process having the operation function specified by the first function information.

In some embodiments, the correspondence relationship between second function information and operation access information comprises: a correspondence relationship among barcode provider identifiers, second function information and operation access information; the operation request message further comprises: a barcode provider identifier; and the second function information unit is configured to, for example, determine second function information according to the first function information, and search the correspondence relationship to obtain operation access information corresponding to the barcode provider identifier and the second function information.

In some embodiments, the first function information comprises: an image of text; the second function information comprises: text content; and the second function information unit determining second function information according to the first function information comprises: recognizing the image of text to obtain the text content; alternatively, the first function information and the second function information comprise: text content; and the second function information unit determining second function information according to the first function information comprises: using the text content received from the terminal device as the second function information.

In some embodiments, the first function information and the second function information comprise: attitude information of the terminal device; and the second function information unit determining second function information according to the first function information comprises: using the attitude information received from the terminal device as the second function information.

In some embodiments, the first function information comprises: fingerprint data; the second function information comprises: a fingerprint identifier; and the second function information unit determining second function information according to the first function information comprises: recognizing the fingerprint data to obtain a corresponding fingerprint identifier; alternatively, the first function information and the second function information comprise: a fingerprint identifier; and the second function information unit determining second function information according to the first function information comprises: using the fingerprint identifier received from the terminal device as the second function information.

In some embodiments, the first function information comprises: audio data; the second function information comprises: a function keyword; and the second function information unit determining second function information according to the first function information comprises: recognizing the audio data and determining the function keyword expressed by the audio data according to a recognition result; alternatively, the first function information comprises: text; the second function information comprises: a function keyword; and the second function information unit determining second function information according to the first function information comprises: determining the function keyword expressed by the text.

In some embodiments, the apparatus further comprises a default operation access information unit configured to return default operation access information to the terminal device when the correspondence relationship does not comprise second function information determined according to the first function information.

The embodiments of the specification provide a terminal device, comprising a memory and a processor, where the memory stores computer programs executable by the processor, and when executing the computer programs, the processor implements the steps of the method for starting an operation process, applied to a terminal device, according to the embodiments of the specification. The above description may be referenced for detailed description of the steps of the method for starting an operation process, applied to a terminal device, which will not be repeated.

The embodiments of the specification provide a computer device, comprising: a memory and a processor, where the memory stores computer programs executable by the processor, and when executing the computer programs, the processor implements the steps of the method for starting an operation process, applied to a server, according to the embodiments of the specification. The above description may be referenced for detailed description of the steps of the method for starting an operation process, applied to a server, which will not be repeated.

The embodiments of the specification provide a computer readable storage medium, which stores computer programs, and the computer programs, when executed by a processor, implement the steps of the method for starting an operation process, applied to a terminal device, according to the embodiments of the specification. The above description may be referenced for detailed description of the steps of the method for starting an operation process, applied to a terminal device, which will not be repeated.

The embodiments of the specification provide a computer readable storage medium, which stores computer programs, and the computer programs, when executed by a processor, implement the steps of the method for starting an operation process, applied to a server, according to the embodiments of the specification. The above description may be referenced for detailed description of the steps of the method for starting an operation process, applied to a server, which will not be repeated.

The above-described is some embodiments of the application, which are not used to limit the application. Any modification, equivalent substitution, or improvement made within the spirit and principle of the application shall be encompassed by the protection scope of the application.

In a typical configuration, a computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include non-volatile and volatile, movable and non-movable media, which can implement information storage through any method or technology. The information may be computer readable instructions, data structures, program modules, or other data. Examples of storage media of computers include, but are not limited to, Phase-change Random Access Memories (PRAMs), Static Random Access Memories (SRAMs), Dynamic Random Access Memories (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassette tapes, cassette and disk memories or other magnetic memory devices, or any other non-transmission media, which can be used for storing information accessible to a computation device. According to the definitions in the specification, the computer readable media do not include transitory media, such as modulated data signals and carriers.

It should be further noted that the terms of "including," "comprising" or any other variants of the terms are intended to encompass a non-exclusive inclusion, causing a process, method, commodity, or device comprising a series of elements to not only comprise these elements, but also comprise other elements that are not explicitly listed, or further comprise elements that are inherent to the process, method, commodity, or device. When there is no further restriction, elements described by the statement "comprising one . . . " does not exclude that a process, method, commodity, or device comprising the above elements further comprises additional identical elements.

One of ordinary skill in the art should understand that the embodiments of the specification may be provided as a method, a system, or a computer program product. Therefore, the embodiments of the specification may be implemented as a complete hardware embodiment, a complete software embodiment, or an embodiment combing software and hardware. Moreover, the embodiments of the specification may be in the form of a computer program product implemented on one or more computer usable storage media (including, but not limited to, a magnetic disk memory, CD-ROM, an optical memory, etc.) comprising computer usable program codes.

What is claimed is:

1. A device, comprising:
one or more processors; and
one or more non-transitory computer-readable mediums coupled to the one or more processors and configured with instructions executable by the one or more processors to perform operations, comprising:
scanning a barcode to obtain barcode information and an image of text associated with the barcode, the image of text specifying an operation function;
determining, based on the barcode information, an address of a server;
recognizing the image of text to determine text content;
sending to the server according to the address of the server an operation request message comprising the text content, for the server to determine operation access information according to a correspondence relationship between the text content and the operation access information;
receiving the operation access information from the server; and
starting an operation process by using the operation access information received from the server, the operation process having the operation function specified by the image of text.

2. The device according to claim 1, wherein scanning the barcode to obtain the barcode information and the image of text associated with the barcode comprises:
scanning the image of text associated with the barcode to obtain the operation function.

3. The device according to claim 1, wherein:
the operations further comprise extracting an identifier of a barcode provider of the barcode from the barcode information; and
the operation request message further comprises: the identifier of the barcode provider of the barcode.

4. The device according to claim 3, wherein the correspondence relationship between the text content and the operation access information comprises a correspondence relationship among a plurality of identifiers of barcode providers, different text content, and respective operation access information.

5. The device according to claim 1, wherein the operation process comprises: registering a user or receiving a coupon.

6. The device according to claim 1, wherein the operation access information comprises: an address of an operation process start page or invocation information of an operation access program.

7. The device according to claim 1, wherein:
the operation access information is default operation access information; and
starting the operation process by using the operation access information received from the server, comprises: starting a default operation process by using the default operation access information.

8. A computer-readable medium configured with instructions executable by one or more processors to perform operations comprising:
scanning a barcode to obtain barcode information and obtain an image of text associated with the barcode, the image of text specifying an operation function;
determining, based on the barcode information, an address of a server;
recognizing the image of text to determine text content;
sending to the server according to the address of the server an operation request message comprising the text content, for the server to determine operation access information according to a correspondence relationship between the text content and the operation access information;
receiving the operation access information from the server; and
starting an operation process by using the operation access information received from the server, the operation process having the operation function specified by the image of text.

9. The computer-readable medium according to claim 8, wherein scanning the barcode to obtain the barcode information the image of text associated with the barcode comprises:
scanning the image of text associated with the barcode to obtain the operation function.

10. The computer-readable medium according to claim 8, wherein the operations further comprise:
extracting an identifier of a barcode provider of the barcode from the barcode information; and
the operation request message further comprises: the identifier of the barcode provider of the barcode.

11. The computer-readable medium according to claim 10, wherein the correspondence relationship between the text content and the operation access information comprises:
correspondence relationship among a plurality of identifiers of barcode providers, different text content, and respective operation access information.

12. The computer-readable medium according to claim 8, wherein the operation process comprises:
registering a user or receiving a coupon.

13. The computer-readable media according to claim 8, wherein the operation access information comprises:
an address of an operation process start page or invocation information of an operation access program.

14. The computer-readable medium according to claim 8, wherein:
the operation access information is default operation access information; and
starting the operation process by using the operation access information received from the server, comprises: starting a default operation process by using the default operation access information.

15. A method, comprising:
scanning, at a terminal device, a barcode to obtain barcode information and an image of text associated with the barcode, the image of text specifying an operation function;
determining, at the terminal device, based on the barcode information, an address of a server;
recognizing, at the terminal device, the image of text to determine text content;
sending, from the terminal device to the server according to the address of the server, an operation request message comprising the text content, for the server to determine operation access information according to a correspondence relationship between the text content and the operation access information;
receiving, at the terminal device, the operation access information from the server; and
starting, at the terminal device, an operation process by using the operation access information received from the server, the operation process having the operation function specified by the image of text.

16. The method according to claim 15, wherein scanning, at the terminal device, the barcode to obtain the barcode information and the image of text associated with the barcode comprises:
scanning, at the terminal device, the image of text associated with the barcode to obtain the operation function.

17. The method according to claim 15, further comprising:
extracting, at the terminal device, an identifier of a barcode provider of the barcode from the barcode information; and
the operation request message further comprises: the identifier of the barcode provider of the barcode.

18. The method according to claim 17, wherein the correspondence relationship between the text content and the operation access information comprises:

correspondence relationship among a plurality of identifiers of barcode providers, different text content, and respective operation access information.

19. The method according to claim 15, wherein:
the operation process comprises: registering a user or receiving a coupon; and
the operation access information comprises: an address of an operation process start page or invocation information of an operation access program.

20. The method according to claim 15, wherein:
the operation access information is default operation access information; and
starting, at the terminal device, the operation process by using the operation access information received from the server, comprises: starting, at the terminal device, a default operation process by using the default operation access information.

* * * * *